United States Patent
Gühring

(10) Patent No.: US 7,339,586 B2
(45) Date of Patent: Mar. 4, 2008

(54) METHOD AND SYSTEM FOR MESH-TO-IMAGE REGISTRATION USING RAYCASTING

(75) Inventor: Jens Gühring, Langensendelbach (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 423 days.

(21) Appl. No.: 11/111,397

(22) Filed: Apr. 21, 2005

(65) Prior Publication Data

US 2005/0237328 A1    Oct. 27, 2005

Related U.S. Application Data

(60) Provisional application No. 60/564,841, filed on Apr. 23, 2004.

(51) Int. Cl.
| | |
|---|---|
| G06T 15/00 | (2006.01) |
| G06T 17/00 | (2006.01) |
| G06T 15/50 | (2006.01) |
| G06T 15/60 | (2006.01) |
| G06K 9/00 | (2006.01) |
| G06K 9/32 | (2006.01) |

(52) U.S. Cl. ............ 345/424; 345/426; 382/130; 382/154; 382/294

(58) Field of Classification Search ............ None
See application file for complete search history.

(56) References Cited

U.S. PATENT DOCUMENTS

| | | | |
|---|---|---|---|
| 6,654,012 B1* | 11/2003 | Lauer et al. ............ 345/424 |
| 6,750,873 B1* | 6/2004 | Bernardini et al. ............ 345/582 |
| 6,807,290 B2* | 10/2004 | Liu et al. ............ 382/118 |
| 6,999,078 B1* | 2/2006 | Akerman et al. ............ 345/424 |
| 7,262,770 B2* | 8/2007 | Sloan et al. ............ 345/426 |
| 2002/0190984 A1* | 12/2002 | Seiler et al. ............ 345/424 |
| 2002/0191822 A1* | 12/2002 | Pieper ............ 382/128 |
| 2003/0016218 A1* | 1/2003 | Zwicker et al. ............ 345/424 |
| 2003/0063787 A1* | 4/2003 | Natanzon et al. ............ 382/131 |
| 2003/0179197 A1* | 9/2003 | Sloan et al. ............ 345/426 |
| 2004/0263511 A1* | 12/2004 | West et al. ............ 345/421 |

(Continued)

OTHER PUBLICATIONS

Kniss et al.; "Gaussian Transfer Functions for Multi-Field Volume Visualization;" 2003; IEEE Computer Society; Proceedings of the 14th IEEE Visualization Conference; pp. 497-504.*

(Continued)

*Primary Examiner*—Mark Zimmerman
*Assistant Examiner*—Crystal Murdoch
(74) *Attorney, Agent, or Firm*—Michele L. Conover

(57) ABSTRACT

A method of registering a digital image with a polygonal mesh comprising the steps of providing a digital image, providing a polygonal mesh comprising a plurality of vertices that approximates an object in the digital image, propagating a ray from a vertex of the polygonal mesh into the digital image and calculating a line integral of opacity values wherein each opacity value corresponds to the intensity of a pixel of the image through which said ray passes, terminating the ray at a point in the image when an opacity threshold is reached, and adding the termination point to a set of closest points. A registration is computed between the vertices of the polygonal mesh and the set of closest points, and the registration is applied to the polygonal mesh to obtain a new set of vertices.

22 Claims, 2 Drawing Sheets

U.S. PATENT DOCUMENTS

| | | | |
|---|---|---|---|
| 2005/0018885 A1* | 1/2005 | Chen et al. | 382/128 |
| 2005/0093889 A1* | 5/2005 | Sauer et al. | 345/633 |
| 2005/0147283 A1* | 7/2005 | Dwyer et al. | 382/128 |
| 2005/0251029 A1* | 11/2005 | Khamene | 600/427 |
| 2005/0265589 A1* | 12/2005 | Raghaven et al. | 382/128 |
| 2006/0056732 A1* | 3/2006 | Holmes | 382/286 |
| 2006/0119600 A1* | 6/2006 | Lokovic | 345/426 |
| 2006/0182325 A1* | 8/2006 | Natanzon et al. | 382/131 |
| 2006/0274065 A1* | 12/2006 | Buyanovskiy | 345/424 |
| 2007/0019846 A1* | 1/2007 | Bullitt et al. | 382/128 |
| 2007/0206008 A1* | 9/2007 | Kaufman et al. | 345/424 |
| 2007/0211051 A1* | 9/2007 | Keller | 345/426 |

OTHER PUBLICATIONS

Ahmed, S. Yamany, and A. Farag, "Fast Algorithm for Registration of FreeForm Curves and Surfaces," Oct. 1997, IEEE International Conference on Image Processing (ICIP97), pp. 1-4.*

S. M. Yamany, M. N. Ahmed, and A. A. Farag, "Novel surface registration using the grid closest point (gcp) transform," Oct. 1998, IEEE International Confenrence on Image Processing, pp. 1-5.*

C. Gasparakis, "Multi-resolution Multi-field Ray Tracing: A mathematical overview," 1999, IEEE, pp. 199-206.*

Wells, W. M., Viola, P., Atsumi, H., Nakajima, S., and Kikinis, R.; "Multi-modal volume registration by maximization of mutual information" 1996, Medical Image Analysis, vol. 1, No. 1, pp. 35-51.*

Morency et al. "Fast 3D Model Acquisition from Stereo Images;" 2002, IEEE Proceddings of the First International Symposium on 3D Data Processing Visualization and Transmission, pp. 1-5.*

Scott, W. and Roth, G.; "View Planning for Automated Three-Dimensional Object Reconstruction and Inspection;" 2003; ACM Computing Surveys; vol. 35, No. 1, pp. 64-96.*

Huesman et al.; "Deformable Registration of Multi-Modal Data Including Rigid Structures;" 2003, IEEE, pp. 1879-1882.*

Birkfellner et al. "A Faster Method for 3D/2D Medical Image Registration—A Simulation Study;" 2003 Physics in Medicine and Biology; pp. 2665-2679.*

Paul J. Besl, et al., A Method for Registration of 3-D Shapes, IEEE Transactions on Pattern Analysis and Machine Intelligence, vol. 14, No. 2, Feb. 1992.

Kauffmann C. et al. "Computer-aided method for quantification of cartilage thickness and volume changes using MRI: validation study using a synthetic model," *IEEE Transactions on Biomedical Engineering IEEE USA* 50:8 Aug. 2003 pp. 978-988 XP002346322.

Montagnat J. et al.: "Anisotropic filtering for model-based segmentation of 4D cylindrical echocardiograph images," *Pattern Recognition Letters, North-Holland Publ.* Amsterdam, NL 24:4-5, Feb. 2003 pp. 815-828 XP004391219.

Malladi R. et al.: "Shape Modeling With Front Propagation: A Level Set Approach" *IEEE Transactions On Pattern Analysis and Machine Intelligence, IEEE Inc.* New York, US 17:2 Feb. 1, 1995 pp. 158-174 XP000491540.

J. Guehring: "Reliable 3D Surface Acquisition, Registration and Validation Using Statisitical Error Models," *Third International Conference On 3-D Digital Imaging and Modeling* 2001 p. 224, XP002346323.

Rusinkiewicz S. et al.: "Efficient variants of the ICP algorithm"*3-D Digital Imaging and Modeling, 2001 Proceedings, Third International Conference* on May 28-Jun. 1, 2001 pp. 145-152 XP0105412858.

* cited by examiner

METHOD AND SYSTEM FOR MESH-TO-IMAGE REGISTRATION USING RAYCASTING

CROSS REFERENCE TO RELATED UNITED STATES APPLICATIONS

This application claims priority from "MESH-TO-IMAGE REGISTRATION USING RAYCASTING", U.S. Provisional Application No. 60/564,841 of Jens Guehring, filed Apr. 23, 2004, the contents of which are incorporated herein by reference.

TECHNICAL FIELD

This invention is directed to registering datasets in a digital medical image by casting rays.

DISCUSSION OF THE RELATED ART

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Image registration is an optimization problem that finds a geometric transformation that maps points from a source dataset space into homologous points in a target dataset space. The objective of image registration is to describe a geometric mapping between two images with some kind of a model, which usually is dependent on parameters, known as registration parameters. The model determines the type of registration, whether it is a rigid, affine, deformable, registration, etc., and therefore the specifics of the registration parameters.

Registration of datasets is an important aspect for many imaging applications. In some applications, one dataset to be registered is provided with a polygonal representation, that is, represented as a triangular mesh, while the other dataset is provided as a volumetric image. One widely used family of registration algorithms are based on the iterative closest point (ICP) algorithm, introduced by Besl and MacKay. The idea behind these algorithms is to find, for a set of points in one dataset, the set of closest compatible points in the other dataset, and compute a transformation that minimizes a cost function penalizing the difference/distance between the established correspondences. Since the established correspondences do not necessarily reflect the true correspondences, the procedure is iterated until a termination criteria is fulfilled. The computation of the corresponding points is one of the most time consuming steps of the algorithm.

In the visualization of medical images, volumetric datasets can be visualized using so-called ray-casting techniques, wherein for each pixel of the display device, a ray is cast into the volumetric dataset, and the intensity and opacity values along the ray are integrated. Typically, the opacity values are obtained by passing the stored intensity data values through a look-up table. The integration along the ray can be stopped if a threshold value for the opacity is reached. Visualization applications can perform ray-casting very efficiently.

SUMMARY OF THE INVENTION

Exemplary embodiments of the invention as described herein generally include methods and systems for casting rays through points on the surface of a polygonal dataset along the surface normal direction in order to compute the closest point on a surface defined in a volumetric dataset, and iteratively minimizing the discrepancy between the point pairs. Applications of the embodiments of the invention include, but are not limited to, registering models of implants (e.g. stents), polygonal surfaces derived from the segmentation of volumetric datasets, and oriented point maps generated during electrophysiological mapping procedures.

According to an aspect of the invention, there is provided a method of registering a digital image with a polygonal mesh comprising the steps of providing a digital image comprising a plurality of intensities corresponding to a domain of points in a D-dimensional space, providing a polygonal mesh comprising a plurality of vertices that approximates an object in the digital image, propagating a ray from a vertex of the polygonal mesh in a direction into the digital image and calculating a line integral of opacity values wherein each opacity value corresponds to the intensity of a pixel of the image through which said ray passes, terminating the ray at a point in the image when an opacity threshold is reached, and adding the termination point to a set of closest points.

According to a further aspect of the invention, the steps of propagating a ray from a vertex of the polygonal mesh into the digital image, terminating the ray at a point in the image, and adding the termination point to a set of closest points are repeated for each vertex in the polygonal mesh. The method further comprises the steps of computing a registration between the vertices of the polygonal mesh and the set of closest points, applying the registration to the polygonal mesh to obtain a new set of vertices, and calculating an error between the set of closest points and the new set of vertices.

According to a another aspect of the invention, the method further comprises, if the error is greater than a predefined threshold, repeating the steps of propagating rays from the mesh vertices into the image, terminating each ray at a point in the image, adding each termination point to a set of closest points, computing a registration between the vertices of the polygonal mesh and the set of closest points, applying the registration to the polygonal mesh to obtain a new set of vertices, and calculating an error between the set of closest points and the new set of vertices.

According to a further aspect of the invention, the ray can be subdivided into n segments of length d, and the line integral of opacity values can be defined by $$\sum_{i=0}^{n} c(s(\vec{x}(id)))d \prod_{j=0}^{i-1} \exp(-\tau(s(\vec{x}(jd)))d),$$

wherein i,j are ray segment counters, $\vec{x}(kd)$ represents the position of the ray at a distance kd of the $k^{th}$ segment, the scalar intensity value corresponding to this position on the ray is denoted by $s(\vec{x}(kd))$, $\tau(s(\vec{x}(kd)))$ represents an absorption look-up table value at said point, and $c(s(\vec{x}(kd)))$ represents an emission look-up table at said point.

According to a further aspect of the invention, said ray is terminated if a predefined distance threshold is reached before said opacity threshold is reached.

According to a further aspect of the invention, the starting point of said ray is offset in a negative direction by said distance threshold.

According to a further aspect of the invention, the direction of said ray is determined by a vector normal to a plane defined by those vertices nearest to the starting vertex of said ray.

According to a another aspect of the invention, the method further comprises the step of imposing an angular threshold on the direction of the ray, wherein if the angle between the ray and a normal to the termination point is greater than a predefined threshold, said termination point is excluded from the set of closest points.

According to a further aspect of the invention, the direction of said ray is determined by taking an average of normals of triangles neighboring said vertex.

According to a further aspect of the invention, the direction of said ray is determined from a stored normal vector associated with the vertex.

According to another aspect of the invention, there is provided a program storage device readable by a computer, tangibly embodying a program of instructions executable by the computer to perform the method steps for registering a digital image with a polygonal mesh.

DETAILED DESCRIPTION OF THE PREFERRED EMBODIMENTS

Figure 1:
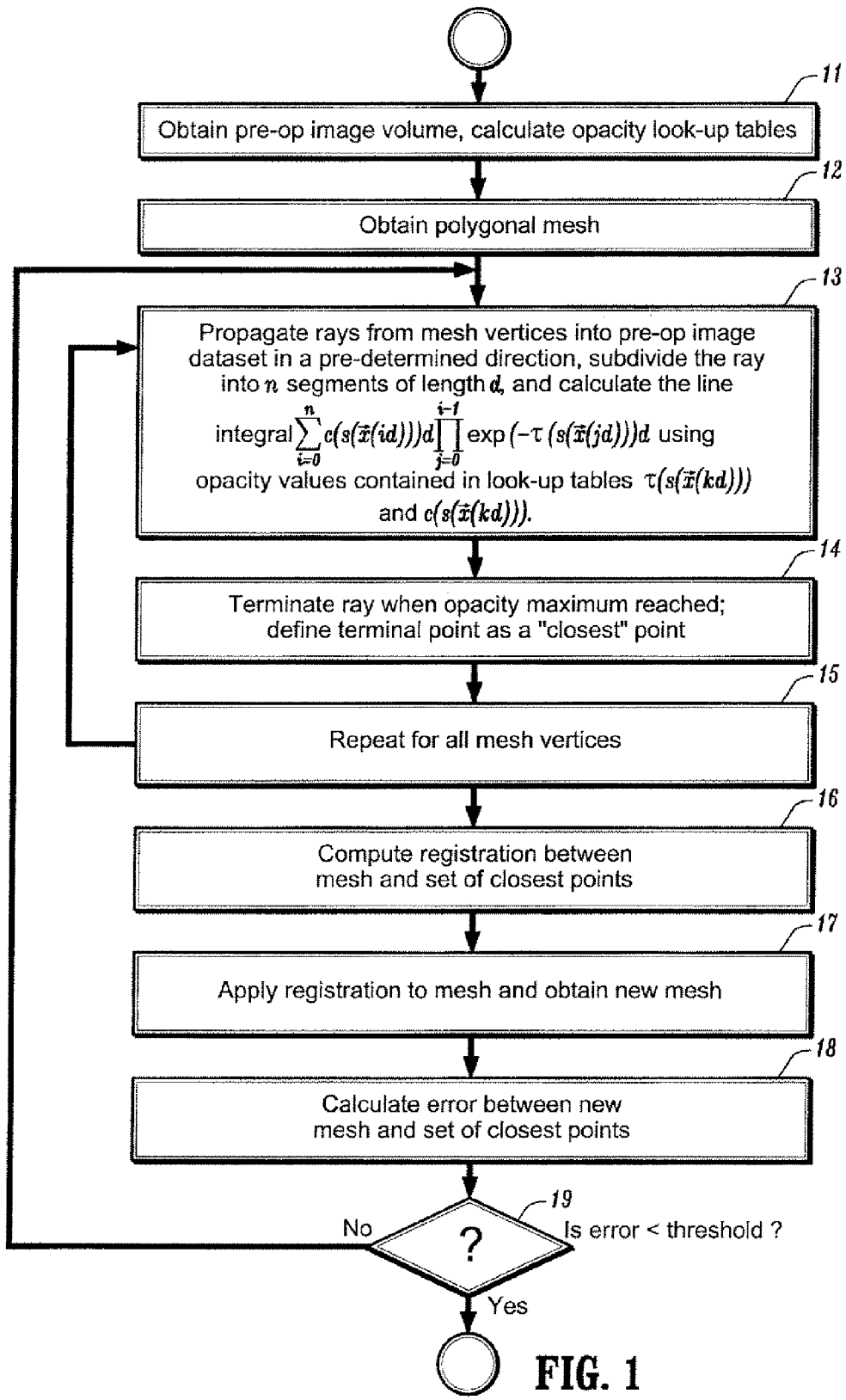
FIG. 1 depicts a flow chart of a registration method according to an embodiment of the invention.

Exemplary embodiments of the invention as described herein generally include systems and methods for performing a polygonal surface to image registration in medical images using ray-casting to find corresponding points.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In many imaging modalities, such as CT or MRI, the resulting intensity values or ranges of values can be correlated with specific types of tissue, enabling one to discriminate, for example, bone, muscle, flesh, and fat tissue, nerve fibers, blood vessels, organ walls, etc., based on the intensity ranges within the image. The raw intensity values in the image can serve as input to a transfer function whose output is an opacity value that can characterize the type of tissue. These opacity values can be used to define a look-up table where an opacity value that characterizes a particular type of tissue is associated with each pixel point. The use of opacity values to classify tissue also enables a user to select an object or tissue type to be displayed and only integrate opacity values corresponding to the selected object or tissue.

In many diagnostic settings, a previously obtained volumetric image is used to guide a medical procedure, such as an examination of an organ. During the course of this procedure, new readings of the organ are frequently acquired that need to be correlated with the volumetric image guiding the examination. These new readings need not be from the same imaging modality used to create the volumetric image. For example, during an electrophysiological examination of the heart, a map of the electric properties of the heart wall is acquired. The measured data includes a point in three dimensions and a direction approximately normal to the heart wall, and can form a polygonal mesh. To support the diagnosis, a 3D CT or MR scan is often acquired before the procedure. These scans typically show quite well the boundary between the inside of the heart chambers and the heart wall, as determined by look-up tables that map pixels in the inside of the chamber to transparent opacity values. Another example of a procedure where a previously obtained volumetric image would need to be registered with a polygonal mesh obtained in the course of the procedure is a hip replacement surgery. In this case, the replacement hip can be represented by polygonal mesh, which needs to be registered with a volumetric image of the hip to be replaced. The origins of the rays to be cast would be the vertices of the mesh.

It is helpful is this kind of diagnostic setting to be able to register the previously obtained volumetric image with the polygonal mesh acquired during the procedure. According to an embodiment of the invention, a ray casting algorithm can perform the registration. Ray casting is a commonly used volume rendering technique. Ray casting is a process that, for each pixel in an image volume to be rendered, casts a single ray from the eye through the center of the pixel and into the volume, integrating optical properties obtained from the encountered volume densities along the ray path. The optical properties can be obtained for the pixel density from a look-up table, and typically include the degree to which a pixel emits and absorbs light. The emission can include RGB values, if the image is a color image. The combination of RGB and absorption is frequently referred to as an RGBA value. For the purposes of the registering methods presented herein, the emission can be regarded as a single, gray-scale value.

A ray cast into a volume can be denoted by $\vec{x}(t)$, where the ray has been parameterized by the distance t to the eye. The scalar intensity value corresponding to this position on the ray is denoted by $s(\vec{x}(t))$. Note that the position of the ray is a pixel or voxel in the image volume. At equispaced intervals along the ray, the volume density is re-sampled, using bilinear interpolation or tri-linear interpolation to reconstruct the original sample. After re-sampling, the scalar data value is mapped to the optical properties via a look-up table, which yields an RGBA value for this location within the volume. The volume rendering integral integrates along the ray absorption coefficients $\tau(s(\vec{x}(t)))$, accounting for the absorption of light, and colors $c(s(\vec{x}(t)))$, accounting for the emission of light. The absorption and emission coefficients can be obtained from look-up tables. The volume rendering integral can be used to obtain the integrated output C, that subsumes the corresponding color (emission) and opacity (absorption) contributions along the ray up to a certain distance D into the volume:

$$C = \int_0^D c(s(\vec{x}(t))) \exp\left(-\int_0^{t'} \tau(s(\vec{x}(t')))dt'\right) dt,$$

where $c(s(\vec{x}(t)))$ represents the color emitted at the point being evaluated, and exp $$\exp\left(-\int_0^{t'} \tau(s(\vec{x}(t')))dt'\right)$$

represents the cumulative absorption at that point. In some cases, the ray-casting integral can be terminated if the integrated output C reaches a threshold value, for example, a value the represents opacity, or complete absorption.

In practice, the integral can be approximated as a summation along ray-segments, where the ray is considered as a succession of ray segments of equal length d, with the number of samples being equal to n=D/d. The emission term for the $i^{th}$ segment can then be approximated as $C_i = c(s(\vec{x}(id)))d$, while the cumulative absorption can be approximated as exp $$\exp\left(-\sum_{i=0}^{t/d} \tau(s(\vec{x}(id)))d\right).$$

The summation in the exponent can be replaced by a multiplication of exponentiation terms:

$$\prod_{i=0}^{t/d} \exp(-\tau(s(\vec{x}(id)))d).$$

Thus, the volume rendering integral can be approximated as $$C_{approx} = \sum_{i=0}^n C_i \prod_{j=0}^{i-1} \exp(-\tau(s(\vec{x}(jd)))d).$$

According to an embodiment of the invention, rays can be cast from the measured sample points outwards in a direction normal to the heart wall. These rays would reach opacity at the point on the heart wall that is closest to the sample point, and the ray-casting integral would be terminated at that point. These two points can form a corresponding point pair in the sense of the ICP algorithm.

As stated previously, the ICP algorithm is a procedure for registering a geometric shape whose internal representation is known with model shape. The first stage of the ICP algorithm is to find a set of points in the model shape that are closest to the points in the geometric shape, according to a distance metric. According to an embodiment of the invention, a ray can be propagated form each point in the measured sample set towards a point in the volumetric dataset. The ray propagation integrates along the ray path in pixel space an opacity (or transparency) value in the look table corresponding to the volumetric dataset, until an opacity threshold is reached, at which point the ray propagation is terminated. The termination point can then be taken as the point in the volumetric dataset that is closest to the point in the sample set. According to an embodiment of the invention, the determination of the closest points can be controlled by modifying the look-up tables, which map image data values to opacity values, and which can be performed interactively by the user. A registration between the sample set and the volumetric dataset can then be determined, and applied to the sample set to form an updated sample set. In the ICP, the registration is based on a translation and a rotation, and thus the updated sample will typically not be perfectly aligned with the volumetric dataset. A mean square error can be calculated between the points in the updated sample set and the points in the volumetric dataset identified as closest point, and if this error falls below a preset threshold, the registration can be terminated. If the registration is not being terminated, the points in the updated sample set can be taken as the starting points for another iteration of ray casting.

A flow chart of a mesh-to-image registration scheme according to an embodiment of the invention is presented in FIG. 1. A pre-operation image volume is provided at step 11, including opacity look-up tables for correlating pixel density to tissue type. At step 12, a polygonal mesh of an object to be registered with the pre-op image volume is obtained. At step 13, a ray is propagated from a vertex of the polygonal mesh, and the volume rendering line integral is calculated along the ray, using opacity values contained in the look-up tables. According to one embodiment of the invention, the direction of the ray can be determined by a vector normal to a plane defined by those vertices nearest to the starting point of the ray. Other method of determining the initial direction include taking the average of the normals of neighboring triangles or using a stored normal vector associated with the vertex. It is to be understood, however, that these examples are non-limiting and other methods of determining the initial ray direction are within the scope of an embodiment of the invention. The look-up tables used are those containing opacity values that correspond to the object approximated by the polygonal mesh. The ray is terminated at a point where an opacity threshold is reached at step 14, and the termination point is added to a set of "closest" points. The ray propagation is repeated for all vertices in the mesh at step 15, to obtain a set of closest points. At step 16, a registration is computed between the polygonal mesh and the set of closest points. There are many registration techniques known in the art. This registration is applied to the mesh at step 17, to obtain an updated mesh. At step 18, an error function, typically a mean square error, is calculated between the points in the updated mesh and the set of closest points, and if the error is less than a predefined threshold, the registration is terminated at step 19. Otherwise, the process returns to step 13 and the ray casting is repeated.

According to another embodiment of the invention, the sample set can be a set of point/direction pairs of arbitrary origin, not only vertices on a polygonal mesh. For example, point/direction pair set could be derived from an acquisition mode that generates oriented points, such as a navigation catheter in an electrophysiology procedure, or points with associated normals derived from a volumetric dataset.

According to another embodiment of the invention, a distance threshold can be used to terminate ray propagation if a maximum distance has been reached from the starting point. A distance threshold is useful for situations where there is a gap or missing feature in the volumetric dataset, for in such as case the line integral of opacity values along the ray may never reach the maximum opacity value. In a further variation of this embodiment, the starting point of a ray propagation can be offset by the distance threshold in a negative ray direction. This can ensure that the ray-casting will find the surface implicitly represented in the volumetric dataset, assuming that the surface lies within the specified distance maximum.

According to a further embodiment of the invention, an angular threshold can be used to check for compatibility between the ray direction and the normal direction at the destination point. This normal can be computed from the local gradient in the volumetric dataset. If the angle between the ray direction and the gradient normal is less than a predetermined value, the corresponding points can be regarding as matching points, while if the angle is greater than the value, the points can be regarded as not belonging to matching features.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 2:
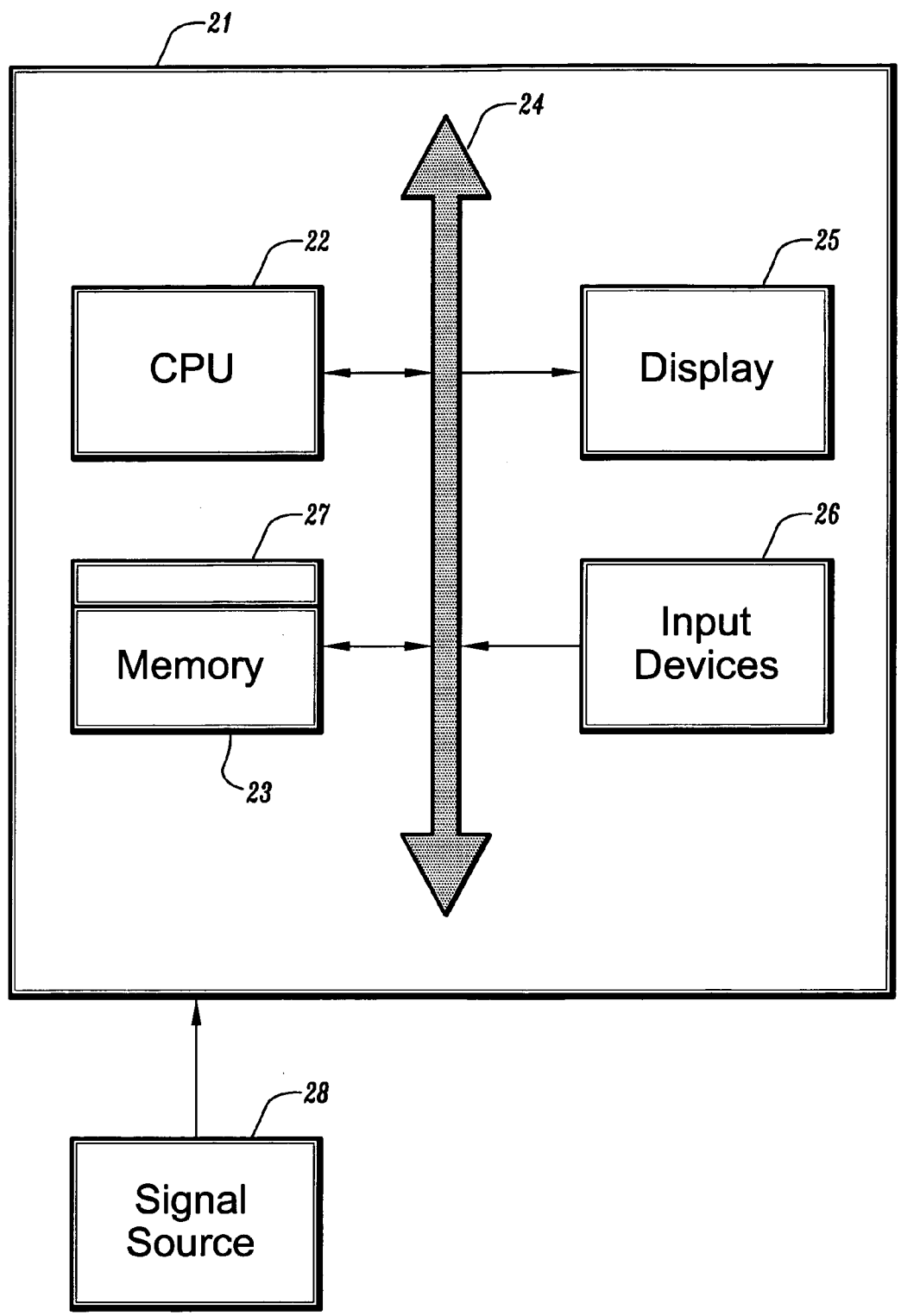
FIG. 2 is a block diagram of an exemplary computer system for implementing a registration scheme according to an embodiment of the invention.

Referring now to FIG. 2, according to an embodiment of the present invention, a computer system 21 for implementing the present invention can comprise, inter alia, a central processing unit (CPU) 22, a memory 23 and an input/output (I/O) interface 24. The computer system 21 is generally coupled through the I/O interface 24 to a display 25 and various input devices 26 such as a mouse and a keyboard. The support circuits can include circuits such as cache, power supplies, clock circuits, and a communication bus. The memory 23 can include random access memory (RAM), read only memory (ROM), disk drive, tape drive, etc., or a combinations thereof. The present invention can be implemented as a routine 27 that is stored in memory 23 and executed by the CPU 22 to process the signal from the signal source 28. As such, the computer system 21 is a general purpose computer system that becomes a specific purpose computer system when executing the routine 27 of the present invention.

The computer system 21 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of registering a digital image with a polygonal mesh comprising the steps of:

providing a digital image comprising a plurality of intensities corresponding to a domain of points in a D-dimensional space;

providing a polygonal mesh comprising a plurality of vertices that approximates an object in the digital image;

propagating a ray from a vertex of the polygonal mesh in a direction into the digital image and calculating a line integral of opacity values wherein each opacity value corresponds to the intensity of a pixel of the image through which said ray passes;

terminating the ray at a point in the image when an opacity threshold is reached; and adding the termination point to a set of closest points.

2. The method of claim 1, wherein the steps of propagating a ray from a vertex of the polygonal mesh into the digital image, terminating the ray at a point in the image, and adding the termination point to a set of closest points are repeated for each vertex in the polygonal mesh, and wherein the method further comprises the steps of:

computing a registration between the vertices of the polygonal mesh and the set of closest points;

applying the registration to the polygonal mesh to obtain a new set of vertices; and calculating an error between the set of closest points and the new set of vertices.

3. The method of claim 2, further comprising, if the error is greater than a predefined threshold, repeating the steps of propagating rays from the mesh vertices into the image, terminating each ray at a point in the image, adding each termination point to a set of closest points, computing a registration between the vertices of the polygonal mesh and the set of closest points, applying the registration to the polygonal mesh to obtain a new set of vertices, and calculating an error between the set of closest points and the new set of vertices.

4. The method of claim 1, wherein the ray can be subdivided into n segments of length d, and the line integral of opacity values can be defined by $$\sum_{i=0}^{n} c(s(\vec{x}(id)))d \prod_{j=0}^{i-1} \exp(-\tau(s(\vec{x}(jd)))d),$$

wherein i,j are ray segment counters, $\vec{x}(kd)$ represents the position of the ray at a distance kd of the $k^{th}$ segment, the scalar intensity value corresponding to this position on the ray is denoted by $s(\vec{x}(kd))$, $\tau(s(\vec{x}(kd)))$ represents an absorption look-up table value at said point, and $c(s(\vec{x}(kd)))$ represents an emission look-up table at said point.

5. The method of claim 1, wherein said ray is terminated if a predefined distance threshold is reached before said opacity threshold is reached.

6. The method of claim 5, wherein the starting point of said ray is offset in a negative direction by said distance threshold.

7. The method of claim 1, wherein the direction of said ray is determined by a vector normal to a plane defined by those vertices nearest to the starting vertex of said ray.

8. The method of claim 1, wherein the direction of said ray is determined by taking an average of normals of triangles neighboring said vertex.

9. The method of claim 1, wherein the direction of said ray is determined from a stored normal vector associated with the vertex.

10. The method of claim 1, further comprising the step of imposing an angular threshold on the direction of the ray, wherein if the angle between the ray and a normal to the termination point is greater than a predefined threshold, said termination point is excluded from the set of closest points.

11. A method of registering an object in a pair of digital images, said method comprising the steps of:
provide a first digital image and a second digital image, each digital image comprising a plurality of intensities corresponding to a domain of points in a D-dimensional space;
extracting an object from said first image, and representing said object by a set of oriented points, wherein each oriented point has an associated direction vector;
for each oriented point in the first image,
propagating a ray from said oriented point of the first image in the direction of said direction vector into the second digital image and calculating a line integral of opacity values wherein each opacity value corresponds to the intensity of a pixel of the second image through which said ray passes;
terminating the ray at a point in the second image when an opacity threshold is reached;
adding the termination point to a set of closest points;
computing a registration between the set of oriented points of-the first image and the set of closest points; and
applying the registration to the set of oriented points to obtain a new set of oriented points.

12. The method of claim 11, wherein said object comprises a subset of points in said first image, and wherein the intensities of the points of said object are in a predetermined range.

13. A program storage device readable by a computer, tangibly embodying a program of instructions executable by the computer to perform the method steps for registering a digital image with a polygonal mesh, said method comprising the steps of:
providing a digital image comprising a plurality of intensities corresponding to a domain of points in a D-dimensional space;
providing a polygonal mesh comprising a plurality of vertices that approximates an object in the digital image;
propagating a ray from a vertex of the polygonal mesh in a direction into the digital image and calculating a line integral of opacity values wherein each opacity value corresponds to the intensity of a pixel of the image through which said ray passes;
terminating the ray at a point in the image when an opacity threshold is reached; and
adding the termination point to a set of closest points.

14. The computer readable program storage device of claim 13, wherein the steps of propagating a ray from a vertex of the polygonal mesh into the digital image, terminating the ray at a point in the image, and adding the termination point to a set of closest points are repeated for each vertex in the polygonal mesh, and wherein the method further comprises the steps of:
computing a registration between the vertices of the polygonal mesh and the set of closest points;
applying the registration to the polygonal mesh to obtain a new set of vertices; and
calculating an error between the set of closest points and the new set of vertices.

15. The computer readable program storage device of claim 14, said method further comprising the step of, if the error is greater than a predefined threshold, repeating the steps of propagating rays from the mesh vertices into the image, terminating each ray at a point in the image, adding each termination point to a set of closest points, computing a registration between the vertices of the polygonal mesh and the set of closest points, applying the registration to the polygonal mesh to obtain a new set of vertices, and calculating an error between the set of closest points and the new set of vertices.

16. The computer readable program storage device of claim 13, wherein the ray can be subdivided into n segments of length d, and the line integral of opacity values can be defined by $$\sum_{i=0}^{n} c(s(\vec{x}(id)))d \prod_{j=0}^{i-1} \exp(-\tau(s(\vec{x}(jd)))d),$$

wherein i,j are ray segment counters, $\vec{x}(kd)$ represents the position of the ray at a distance kd of the $k^{th}$ segment, the scalar intensity value corresponding to this position on the ray is denoted by $s(\vec{x}(kd))$, $\tau(s(\vec{x}(kd)))$ represents an absorption look-up table value at said point, and $c(s(\vec{x}(kd)))$ represents an emission look-up table at said point.

17. The computer readable program storage device of claim 13, wherein said ray is terminated if a predefined distance threshold is reached before said opacity threshold is reached.

18. The computer readable program storage device of claim 17, wherein the starting point of said ray is offset in a negative direction by said distance threshold.

19. The computer readable program storage device of claim 13, wherein the direction of said ray is determined by a vector normal to a plane defined by those Vertices nearest to the starting vertex of said ray.

20. The computer readable program storage device of claim 13, said method further comprising the step of imposing an angular threshold on the direction of the ray, wherein if the angle between the ray and a normal to the termination point is greater than a predefined threshold, said termination point is excluded from the set of closest points.

21. The computer readable program storage device of claim 13, wherein the direction of said ray is determined by taking an average of normals of triangles neighboring said vertex.

22. The computer readable program storage device of claim 13, wherein the direction of said ray is determined from a stored normal vector associated with the vertex.

* * * * *